Figure 3:
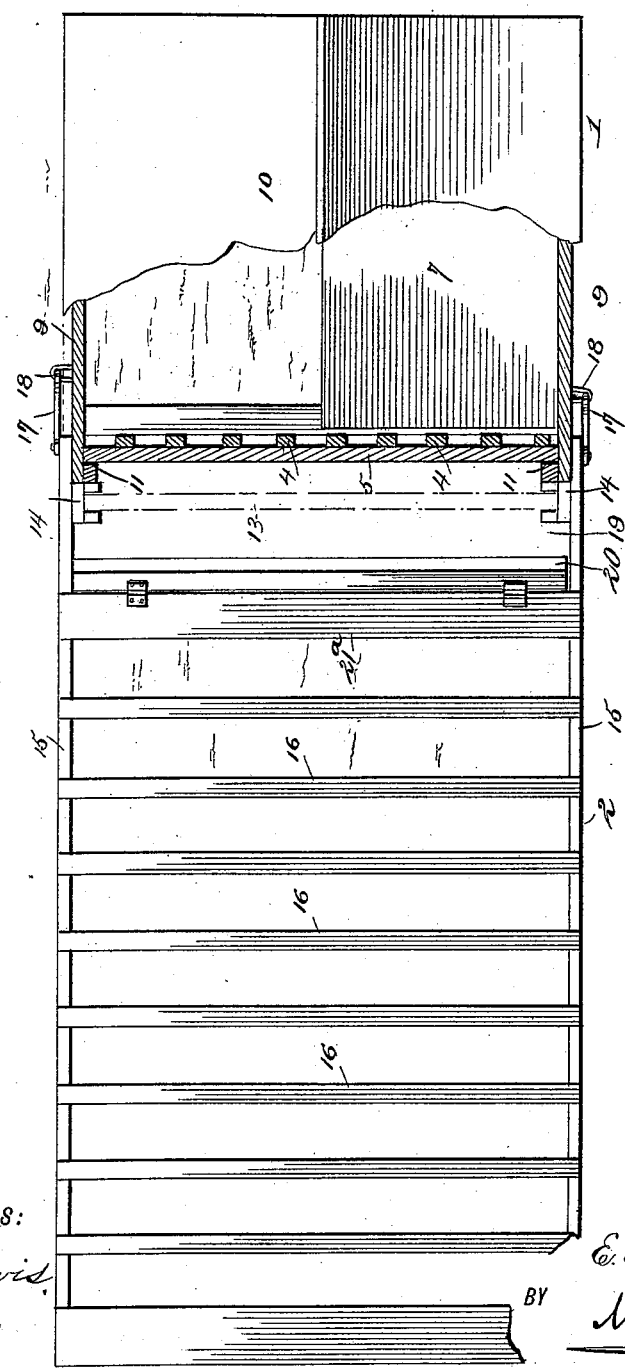

(No Model.) 2 Sheets—Sheet 1.
E. BUTTERICK.
HEN COOP.
No. 405,008. Patented June 11, 1889.
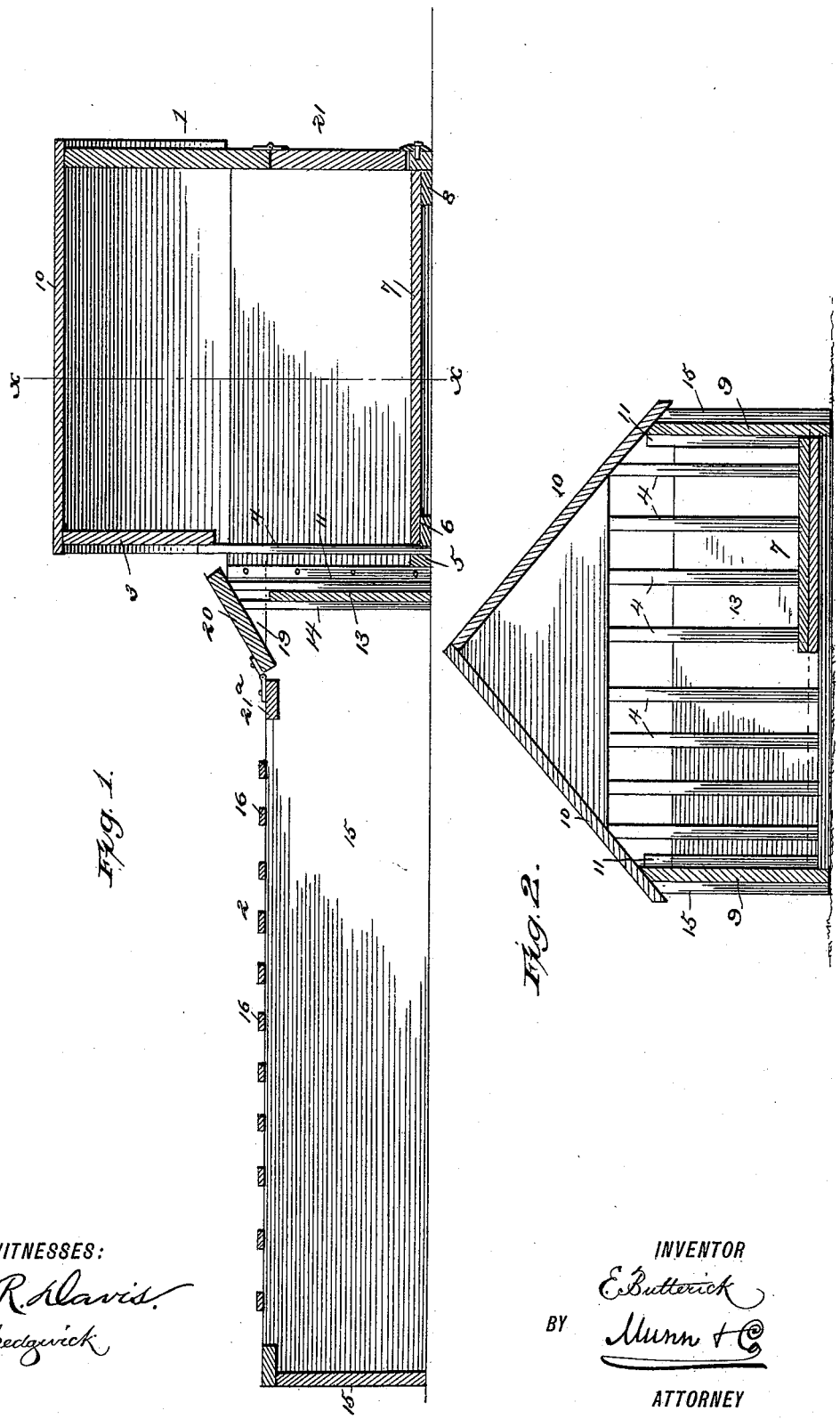
WITNESSES:
W. R. Davis.
C. Sedgwick
INVENTOR
E. Butterick
BY Munn & Co.
ATTORNEY (No Model.)  E. BUTTERICK.  2 Sheets—Sheet 2.
HEN COOP.

No. 405,008.   Patented June 11, 1889.

WITNESSES:
W. R. Davis
E. Sedgwick

INVENTOR
E. Butterick
BY
Munn & Co.
ATTORNEY

UNITED STATES PATENT OFFICE.

EBENEZER BUTTERICK, OF BROOKLYN, NEW YORK.

HEN-COOP.

SPECIFICATION forming part of Letters Patent No. 405,008, dated June 11, 1889.

Application filed May 22, 1888. Serial No. 274,707. (No model.)

*To all whom it may concern:*

Be it known that I, EBENEZER BUTTERICK, of Brooklyn, in the county of Kings and State of New York, have invented a new and Improved Hen-Coop for Breeding Purposes, of which the following is a full, clear, and exact description.

This invention relates to hen-coops, and has especial reference to hen-coops adapted for breeding young chickens.

The object of the invention is to provide a breeding hen-coop so constructed as to afford every advantage for the raising of young chickens.

The invention consists of a hen-coop for this purpose constructed and arranged as hereinafter described and claimed.

Reference is to be had to the accompanying drawings, forming a part of this specification, in which similar figures of reference indicate corresponding parts in all the views.

Figure 1 is a side view of the invention in vertical longitudinal section. Fig. 2 is a vertical horizontal section on the line $x$ $x$ of Fig. 1, and Fig. 3 is a plan view partly in section and broken away.

The invention comprises in its main features the main or covered portion 1 and the extension 2, called the "runway" for the chickens. The main or covered portion 1 is constructed with a flap-door 21 at its front for the admission of a hen and at its rear with the covered portion or side 3, extending down to above the height of the extension 2, and the slats 4, extending from the covered portion 3 to the transverse bottom cleats 5 and 6 of the coop, to which they are secured. The bottom of the main or covered portion 1 is covered by a loosely-laid flooring consisting of boards 7, resting on the cleats 6 and 8. By this means the chickens when very young will be protected from the ground. One of the boards 7 may be removed and laid on the other, thereby leaving a dry portion for the hen and chickens and ground for the hen to scratch on. When the chickens have grown older, both boards may be removed to afford more ground. The sides 9 of the main portion 1 extend slightly beyond the roof 10, as shown, and have secured thereto cleats 11, which serve to retain a board when placed therein, the board extending over and resting against the slats 4.

The board for this purpose is indicated by 13 and shown as located in grooved uprights 14 at the end of the runway 2, thereby closing the same. The runway 2, as shown, is constructed open at the bottom and with sides and end 15, and covered by slats 16. The sides 15 of the extension 2 are shown as overlapping the extended sides 9 of main inclosure, the ends of sides 9 abutting against the uprights 14 when the runway and coop are on a level place, thereby forming a close joint. By thus having the sides 15 of the runway overlap the sides of the main inclosure the runway may be placed at an upward incline to the said main inclosure, or vice versa, without making an open joint through which the chickens could escape.

In order that the runway may be set at an incline to the main inclosure, as just described, I have connected these parts by a hook-and-staple connection which is sufficiently loose to allow for such adjustment where slight inequalities exist, for it will be understood that it is not intended to use the coop on ground having great unevenness of surface. If preferred, the sides and ends may be formed of open-work—such as slats—or the whole of the runway may be constructed of wire, if preferred. The runway may be made of a suitable length and is adapted to provide room for the chickens to run around, while the mother is kept by the slats 4 in the main portion 1. As the chickens grow larger a longer runway may be substituted and more ground thereby provided for them to scratch on. The runway may be secured to the main portion 1 by hooks 17 and staples 18, as shown, or in any other suitable manner, and is provided with an opening 19, covered by a door 20, hinged to a cross-piece 21$^a$, by means of which food may be introduced. The door 20 also serves as a shield against rain entering between slats 4 upon the boards 7, the door 20 resting on the extended sides 9. When it is desired to cover up the slats 4 on account of the weather or to prevent the chickens running out, the board 13 is employed in connection with the cleats 11, as before stated. When it is desired to separate the chickens from the mother, the board 13 is located in the grooved strips 14, with the chickens within the runway.

If desired, the runway may be detached and the covered portion 1 only used. It will be seen that by means of this invention a hen-coop is provided in which chickens may be raised in the most effective manner.

Having thus fully described my invention, I claim as new and desire to secure by Letters Patent—

1. The combination, with the coop or main inclosure having a slatted front, of the runway in front of the said coop and having its sides at their inner ends overlapping the sides of the coop, whereby the runway and coop may be set at different inclinations without causing an open joint between them, substantially as set forth.

2. The combination of the coop having the upper part of its front closed and the lower part slatted, with the runway having a vertically-swinging door inclined from the closed upper part of the front of the coop downward to prevent rain from driving through the slatted part, substantially as set forth.

3. The combination of the coop having its front closed above the top edges of its sides and slatted below the same, the said sides being extended in front of the slats, and cleats 11, forming vertical ways to allow a board to be inserted therein against the front sides of the slats, with the runway having the inner ends of its sides overlapping the sides of the coop, the vertical cleats 14 on the inner faces of the sides of the runway near their inner ends and abutting against the extended ends of the coop, and the inclined hinged door 20 on top of the runway at its inner end, substantially as set forth.

EBENEZER BUTTERICK.

Witnesses:
EDWARD W. CODY,
EDGAR TATE.